(12) United States Patent
Wu et al.

(10) Patent No.: US 8,143,911 B2
(45) Date of Patent: Mar. 27, 2012

(54) INPUT/OUTPUT DRIVER SWING CONTROL AND SUPPLY NOISE REJECTION

(75) Inventors: Zuoguo Wu, Santa Clara, CA (US); Feng Chen, Portland, OR (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 12/060,251

(22) Filed: Mar. 31, 2008

(65) Prior Publication Data

US 2009/0245416 A1 Oct. 1, 2009

(51) Int. Cl.
*H03K 17/16* (2006.01)
*H03K 19/003* (2006.01)
*H03K 19/0175* (2006.01)

(52) U.S. Cl. .......................................... 326/21; 326/82
(58) Field of Classification Search ............. 326/21, 326/26, 27, 30, 31, 23, 82, 83, 68, 86, 93, 326/95; 327/140
See application file for complete search history.

(56) References Cited

U.S. PATENT DOCUMENTS

| 7,288,967 B2 * | 10/2007 | Byun et al. ............ 326/83 |
| 2003/0085736 A1 * | 5/2003 | Tinsley et al. ........ 326/81 |
| 2004/0120406 A1 * | 6/2004 | Searles et al. ........ 375/259 |
| 2007/0071111 A1 * | 3/2007 | Muljono et al. ...... 375/257 |
| 2007/0075776 A1 * | 4/2007 | Garlapati et al. ..... 330/259 |
| 2008/0238482 A1 * | 10/2008 | Tian et al. ............ 326/82 |

* cited by examiner

*Primary Examiner* — Shawki S Ismail
*Assistant Examiner* — Dylan White
(74) *Attorney, Agent, or Firm* — Ryder, Lu, Mazzeo and Konieczny, LLC; Douglas J. Ryder

(57) ABSTRACT

In general, in one aspect, the disclosure describes an apparatus having an averager to receive differential output voltages of a transmitter and generate an average transmitter output voltage. A comparator is to compare the average transmitter output voltage to a reference voltage and generate a difference therebetween. An integrator is to integrate the difference between the average transmitter output voltage and the reference voltage over time. The integrated difference is fed back to the transmitter to bias the transmitter.

20 Claims, 5 Drawing Sheets

INPUT/OUTPUT DRIVER SWING CONTROL AND SUPPLY NOISE REJECTION

BACKGROUND

Data transmitters are used to send digital information across data links. For high speed input/output (I/O) links such as Quick-Path Interconnect (QPI) and Fully Buffered DIMM (FBD), current mode differential transmitters are most commonly used. Output signal amplitude is controlled by properly setting the driver current. Due to process variations, some form of compensation is necessary to maintain the transmitter output swing within a reasonably range for high volume manufacturing (HVM). For example, a global current compensation (Icomp) may be applied to the individual transmitter bits to set the driver current. The Icomp is a bias current that is adjusted by comparing the output signal of a replica driver to a reference voltage. The distribution of Icomp is susceptible to die variations and mismatches between all the individual transmitter drivers and the replica driver.

BRIEF DESCRIPTION OF THE DRAWINGS

The features and advantages of the various embodiments will become apparent from the following detailed description in which.

DETAILED DESCRIPTION

Figure 1:
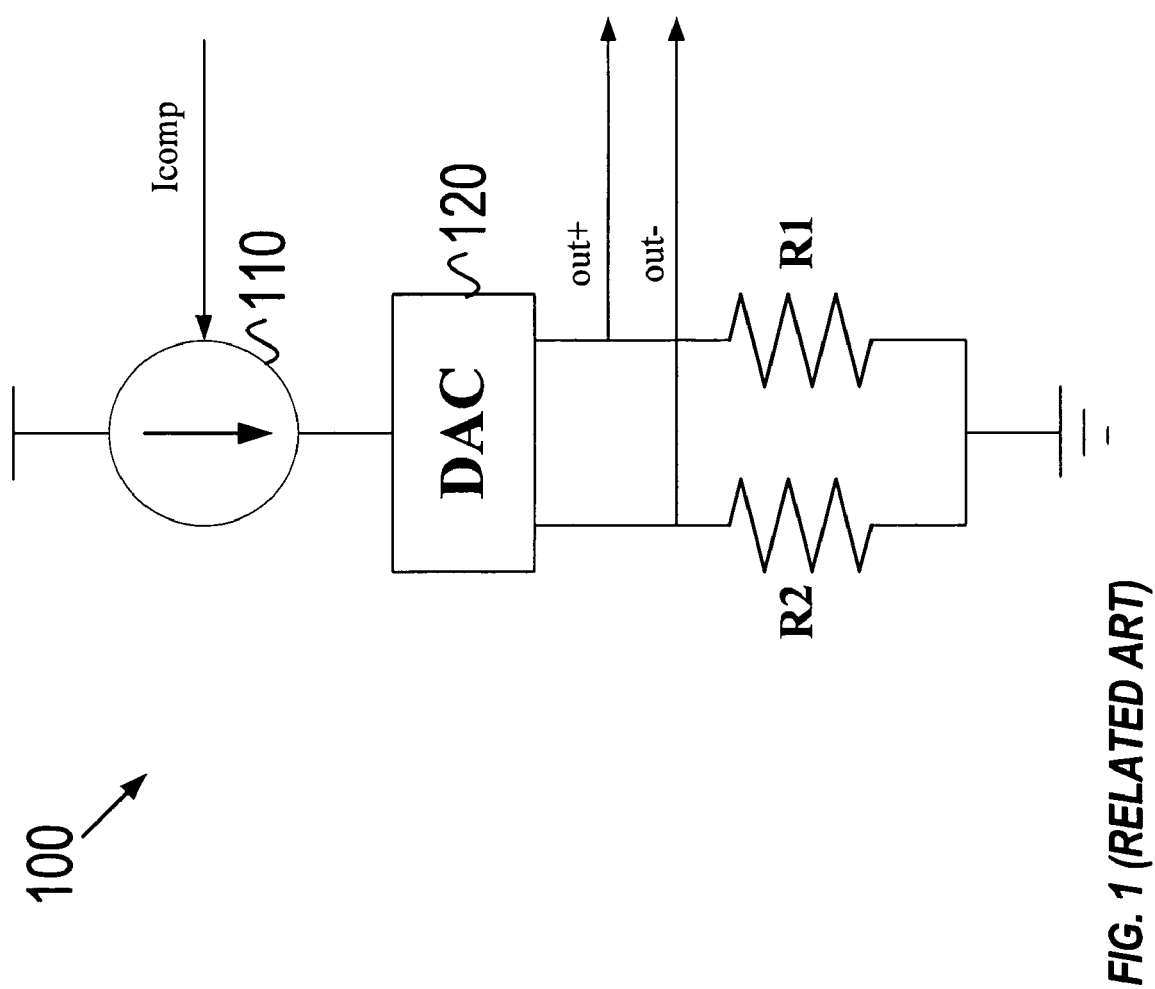
FIG. 1 illustrates an example transmitter driver utilized in a data link, according to one embodiment.

FIG. 1 illustrates an example transmitter driver 100 utilized in a data link. The transmitter driver 100 includes a current source (I) 110, a digital to analog converter (DAC) 120 and a pair or parallel resistors R1, R2. The transmitter driver 100 provides a differential output with the voltage drop across the resistor R1 being the out+ and the voltage drop across the resistor R2 being the out−. For binary data 1, the voltage at out+ is I*R1 while the voltage at out− is 0. For binary data 0, the voltage at out+ is 0 and the voltage at out− is I*R2. Accordingly, the differential peak to peak swing of the transmitter driver 100 is I*(R1+R2). The current source 110 receives a bias signal to bias the current generated thereby. The bias signal may be received by bias drivers (not illustrated) that are utilized to bias the current source 110. The bias signal may be a global current compensation signal (Icomp) that is provided to all the transmitter drivers within an input/output (I/O) link.

Figure 2:
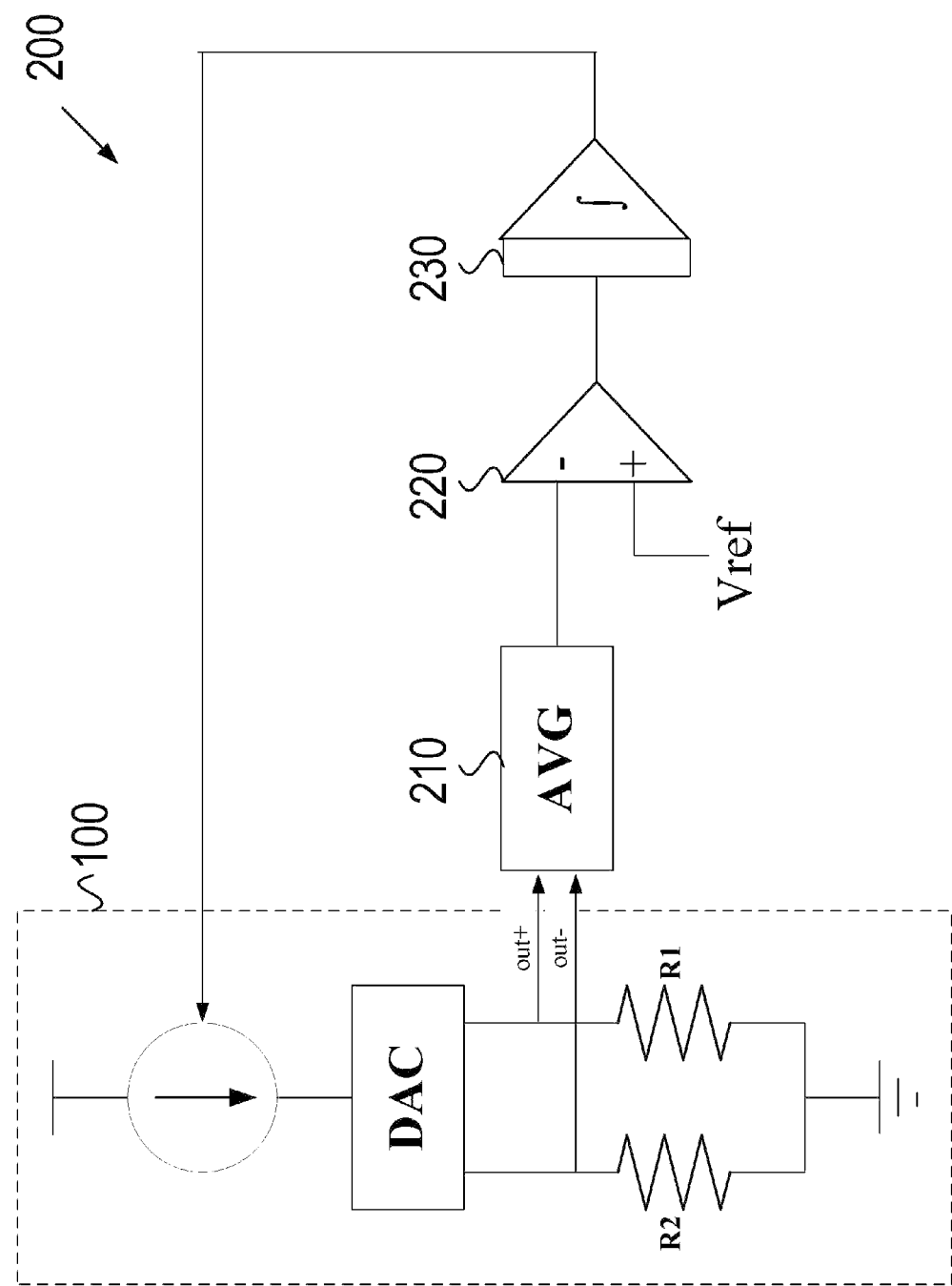
FIG. 2 illustrates an example transmitter swing control circuit, according to one embodiment.

FIG. 2 illustrates an example transmitter swing control circuit 200 utilized with a transmitter driver 100 in a data link. The circuit 200 includes an averager 210, a comparator 220 and an integrator 230. The averager 210 receives the outputs (out+, out−) of the transmitter driver 100 and generates an average therefrom for both binary 0 and binary 1. The averager 210 output is ((I*R1+0)/2+(0+I*R2)/2)/2 which equals I*(R1+R2)/4. This output is ¼ of the transmitter output differential peak to peak swing. Accordingly, utilizing the averager 210 to compute an average output of the transmitter driver 100 and using the average output as a measurement of voltage swing enables the transmitter swing to be controlled by adjusting the average output.

According to one embodiment, the averager 210 may be implemented as a pair of parallel resisters with the first resister receiving the out+ and the second resister receiving the out− so that the current flowing through the resisters is the current associated with the average voltage (voltage swing). The averager 210 is not limited to a pair of resistors. Rather it may be implemented in other manners including according to one embodiment as a switched capacitor.

The average voltage is provided to the comparator 220 where it is compared to a reference voltage. According to one embodiment, the comparator 220 may compare the current associated with the average voltage to the current associated with the reference voltage. The current associated with the reference voltage may be determined by connecting the reference voltage to a first of a pair of parallel resisters and tying the second resister to ground. The current difference may be provided to an integrator 230 that integrates the differences over time. The integrator 230 may be an amplifier integrator that amplifies the difference and then captures the amplified difference in a capacitor over time. According to one embodiment, the amplifier may be self-biased. The integrated difference is provided to the current source 110 to provide a bias thereto. The integrated difference may be provided to the bias drivers within the transmitter driver 100 that are utilized to bias current source 110. The feedback theoretically forces the error between the average transmitter driver output voltage and the reference voltage to be 0, hence achieving driver swing control.

The example transmitter swing control circuit 200 can be implemented with a relatively small amount of devices and relatively small amount of silicon area. Accordingly, the transmitter swing control circuit 200 can be implemented for each transmitter driver (each bit) in a data link. Providing current biasing for each transmitter driver enables compensation for low frequency drifting and temperature change for each bit individually to account for process, voltage, and temperature (PVT) variations.

The circuit 200 directly senses and controls driver output per bit and accordingly eliminates variations due to device mismatches. The circuit 200 may be used for wide output swing range. The circuit 200 may operate while the data is transmitting, thus enabling tracking for low frequency and temperature drift. The circuit 200 reduces I/O transmitter signal variation and therefore can increase worst case (minimum) available signal which can lead to higher data rate. The increase in minimum signal available becomes more beneficial at higher data rate where minimum signal available can be a performance limiter. The circuit 200 is applicable to all differential I/O interfaces.

Figure 3:
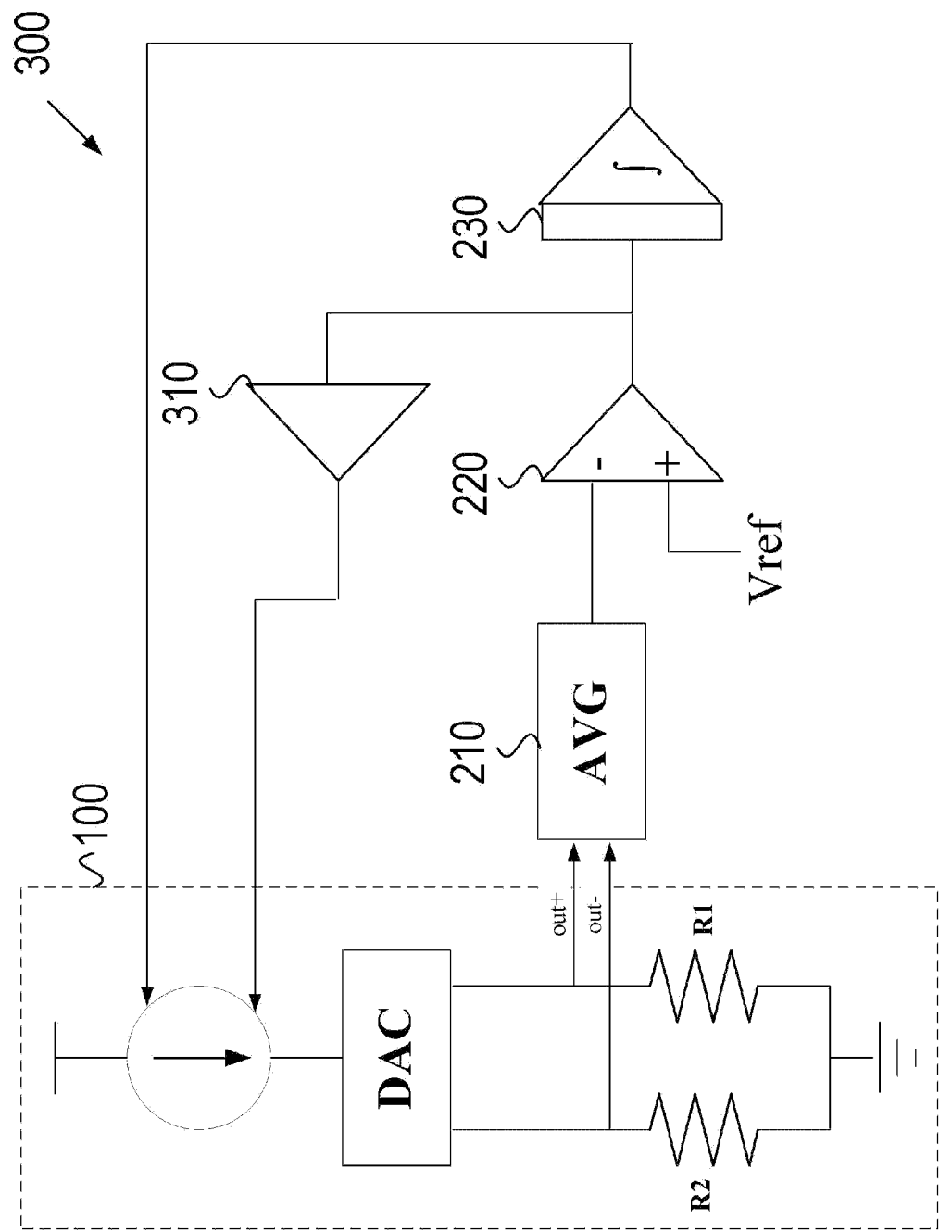
FIG. 3 illustrates an example dual path transmitter swing control circuit, according to one embodiment.

FIG. 3 illustrates an example dual path transmitter swing control circuit 300 utilized with a transmitter driver 100 in a data link. The circuit 300 includes a second feedback loop in addition to the feedback loop provided by the circuit 200. The second loop includes an amplifier 310 to amplify the difference and provide the amplified difference as feedback at a faster rate. The first loop that includes the integrator 230 can be considered the slow path while the second path that includes the amplifier 310 can be considered the fast path.

The amplified difference (current) may be injected directly into the current source 110. The current source 100 may be modified to receive the amplified difference from the amplifier 310. For example, a transistor stack used for generating the current may be modified to receive the amplified difference. The current source 100 may be modified to account for the current injection by changing the size (reducing) of the tail current device (transistor coupled to voltage source in the transistor stack).

The high speed of the fast path enables the circuit 300 to respond to package resonance induced supply variation (usually at 100-200 MHz). Accordingly, the transmitter swing variation caused by supply noise at this frequency may be compensated for with the fast track feedback. The amplification of the difference by the amplifier 310 may result in a DC offset between the feedback and the current source 110. The slow feedback path may be utilized to account for the DC offset injected by the fast path. The fast path and the slow path may be summed within the transmitter driver 100 with the slow path providing the bias to the current source 110 via the bias drivers and the fast path directing injecting current into the current source 110. Accordingly, the dual loop topology provides good DC swing control as well as improved supply noise rejection up to resonant frequency.

The example transmitter swing control circuit 300 can be implemented with relatively minor changes to the transmitter driver and a relatively small amount of additional devices that take up a relatively small amount of silicon area. The additional current used by the fast path (the amplifier 310) can be tolerated since the current utilized by a global current compensation (Icomp) may no longer be required. Accordingly, the overall system level power doesn't necessarily increase with the use of the example circuit 300.

Furthermore, since the example circuit 300 can reduce the transmitter swing variation due to supply voltage changes, both at DC and package resonance, it is possible to modify the transmitter driver 100 to remove a cascode device (not illustrated) that may be included therein to provide a high DC impedance to reduce the effects of supply voltage changes. Being able to remove the cascade device from transmitter driver 100 may save silicon area and reduce the voltage headroom requirement of the transmitter driver 100. Accordingly, use of the circuit 300 may provide increased scalability.

Figure 4:
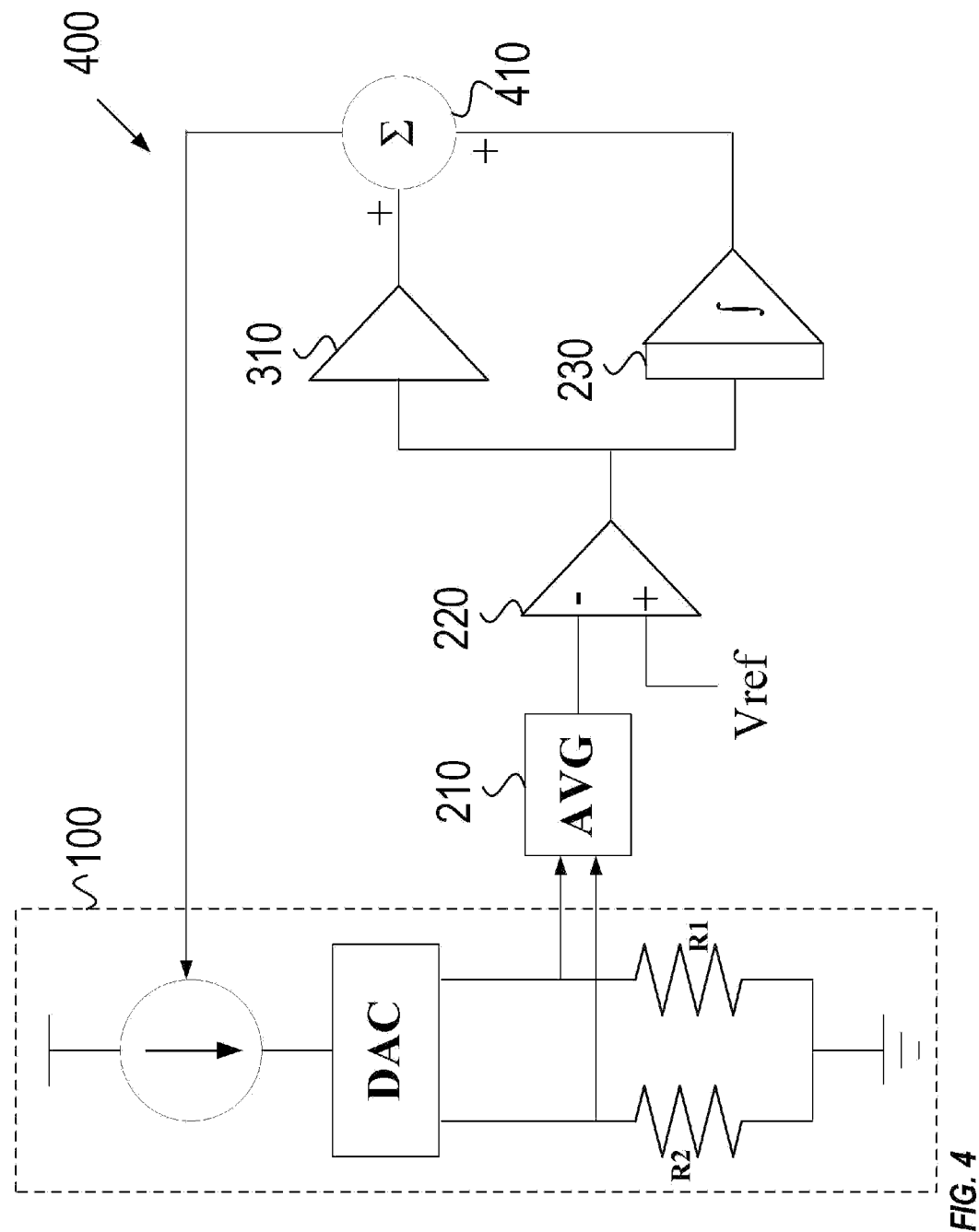
FIG. 4 illustrates an example dual path transmitter swing control circuit, according to one embodiment.

FIG. 4 illustrates an example dual path transmitter swing control circuit 400 where the summation of the fast path and the slow path is performed external to the transmitter driver 100 by a summer 410. The summer 410 sums that fast path and the slow path provides the summed signal to the transmitter driver 100. The summed feedback signal may be provided as the bias circuit so that the current source need not be modified.

Figure 5:
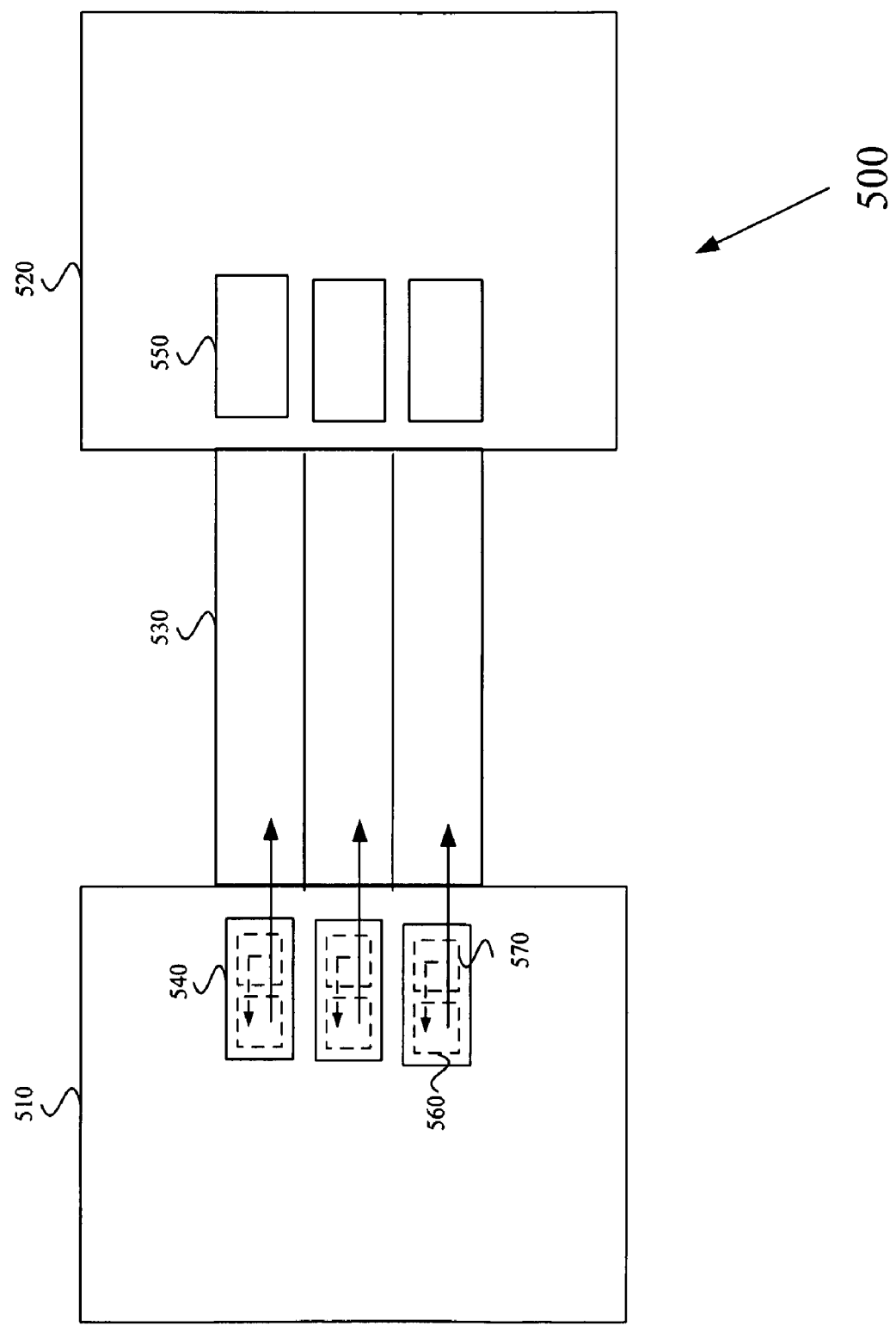
FIG. 5 illustrates an example computer system utilizing a swing control circuit in the transmitter driver, according to one embodiment.

FIG. 5 illustrates an example computer system 500 utilizing a swing control circuit (e.g., 200, 300, 400). The system includes a first circuit 510 and a second circuit 520 connected with a parallel I/O link 530. The first circuit 510 includes transmitters 540 and the second circuit includes receivers 550. The transmitters 540 include a transmitter driver 560 and a swing control circuit 570 proving feedback to the transmitter driver 560 to control the voltage swing thereof.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising
    an averager to receive differential output voltages of a transmitter and generate an average transmitter output voltage;
    a comparator to compare the average transmitter output voltage to a reference voltage and generate a difference therebetween; and
    an integrator to integrate the difference between the average transmitter output voltage and the reference voltage over time, wherein the integrated difference is fed back to the transmitter to bias the transmitter.

2. The apparatus of claim 1, wherein the apparatus is to operate with transmitters having a wide output swing range.

3. The apparatus of claim 1, wherein the apparatus is to operate while the transmitter is transmitting data.

4. The apparatus of claim 1, wherein the apparatus is to be implemented for each transmitter in a data link.

5. The apparatus of claim 1, wherein the averager is to approximate output differential peak to peak swing of the transmitter.

6. The apparatus of claim 1, wherein the averager is to directly sense transmitter output.

7. The apparatus of claim 1, further comprising an amplifier to receive the difference from the comparator and amplify the difference and fed back the amplified difference to the transmitter at a high frequency.

8. The apparatus of claim 7, wherein the high frequency of the amplified difference feedback is to compensate for resonance induced supply noise.

9. The apparatus of claim 7, wherein the amplified difference is injected into a current source in the transmitter.

10. The apparatus of claim 7, wherein the amplified difference and the integrated difference are summed within the transmitter.

11. The apparatus of claim 7, further comprising a summer to sum the amplified difference and the integrated difference.

12. An input/output device comprising
    a plurality of communication links;
    transmitter drivers within each of the communication links; and
    swing control circuits for each transmitter driver, wherein the swing control circuits include
        an averager to receive differential output voltages from the transmitter drivers and to generate an average transmitter driver output voltage;
        a comparator to compare the average transmitter driver output voltage to a reference voltage and generate a difference therebetween; and
        an integrator to integrate the difference between the average transmitter driver output voltage and the reference voltage over time, wherein the integrated difference is fed back to the transmitter to bias the transmitter.

13. The device of claim 12, wherein the swing control circuits are to operate while the transmitter drivers are transmitting data.

14. The device of claim 12, wherein the averager is to approximate output differential peak to peak swing of the transmitter driver.

15. The device of claim 12, further comprising an amplifier to receive the difference from the comparator and amplify the difference and fed back the amplified difference to the transmitter driver at a high frequency.

16. The device of claim 15, wherein the amplified difference is injected into a current source in the transmitter.

17. The device of claim 15, further comprising a summer to sum the amplified difference from the amplifier and the integrated difference from the integrator and to provide the summed difference to the transmitter driver.

18. A system comprising
a first processor having a transmitter to transmit data, wherein the transmitter includes a swing control circuit that measures the voltage swing for each driver within the transmitter and adjusts the swing of each driver individually, wherein the swing control circuit includes
an averager to receive differential output voltages from the transmitter drivers and to generate an average transmitter driver output voltage;
a comparator to compare the average transmitter driver output voltage to a reference voltage and generate a difference therebetween; and
an integrator to integrate the difference between the average transmitter driver output voltage and the reference voltage over time, wherein the integrated difference is fed back to the transmitter to bias the transmitter;
a second processor having a receiver to receive data; and
a data link between the first and the second processor.

19. The system of claim 18, wherein the swing control circuits further include an amplifier to receive the difference from the comparator and amplify the difference and fed back the amplified difference to the transmitter driver at a high frequency.

20. The system of claim 19, further comprising a summer to sum the amplified difference from the amplifier and the integrated difference from the integrator.

* * * * *